Nov. 19, 1968   C. J. HIRSCH ET AL   3,412,381

JITTER-FREE DISTANCE MEASURING EQUIPMENT

Filed Nov. 10, 1965 — 2 Sheets-Sheet 1

INVENTORS
CHARLES J. HIRSCH &
GUELINO A. LUCCHI

BY *Joseph A. Hill*
ATTORNEY

INVENTORS
CHARLES J. HIRSCH
& GUELINO A. LUCCHI

United States Patent Office 3,412,381
Patented Nov. 19, 1968

3,412,381
JITTER-FREE DISTANCE MEASURING
EQUIPMENT
Charles J. Hirsch, Princeton, N.J., and Guelino A. Lucchi, San Fernando, Calif., assignors to the United States of America as represented by the Secretary of the Army
Filed Nov. 10, 1965, Ser. No. 507,260
4 Claims. (Cl. 340—164)

This invention relates to a signal decoding system and more particularly to a system for generating reply signals upon the realization of a coincidental relationship between the generated signals and delayed interrogation signals. While the present invention is capable of operating within the confines of many systems generally, it finds particular utility within the TACAN or DME system. TACAN (Tactical Air Navigation System) and DME (Distance Measuring Equipment) both rely upon receiving an interrogation signal from an aircraft desiring position data and transmitting a reply signal to this aircraft. This interrogation pulse usually comprises a pair of pulses separated by a fixed spacing such as 12μs. or 36μs. For effective operation of the TACAN or DME it is essential that the reply pulse be triggered by a true interrogation pulse pair, separated by precisely the fixed spacing such as 12μs. or 36μs. The process of decoding the interrogation signal and generating a reply signal are generally performed by circuits which are active in nature. These circuits may include limiters, clippers, blocking oscillators or the like. Each of these introduce a certain amount of jitter in the time relationship between the reception of the interrogation signal and its subsequent reply, thereby introducing an error.

A object of this invention is to reduce the amount of signal processing and thereby reduce the jitter.

Another object of this invention is to propose a system which uses only the first pulse of the interrogation pulse pair to generate both pulses of the reply pair.

Still another object of this invention is to transmit a reply signal only when a coincidental relationship exists between the reply signal and the interrogation pulses.

Figure 1A:
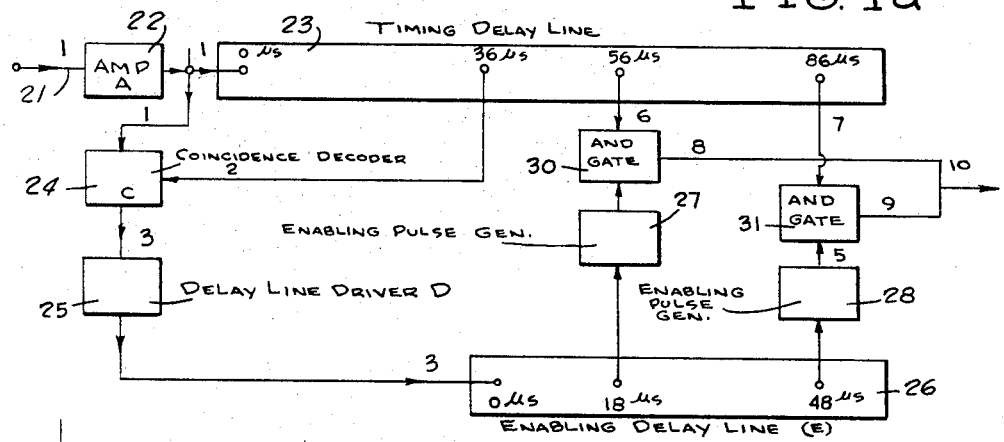
FIG. 1a is a block diagram of the invention. For purposes of explanation the invention will accept interrogation pulses with a 36μs. spacing and reply with a pair of pulses separated by 30μs.
Figure 1B:
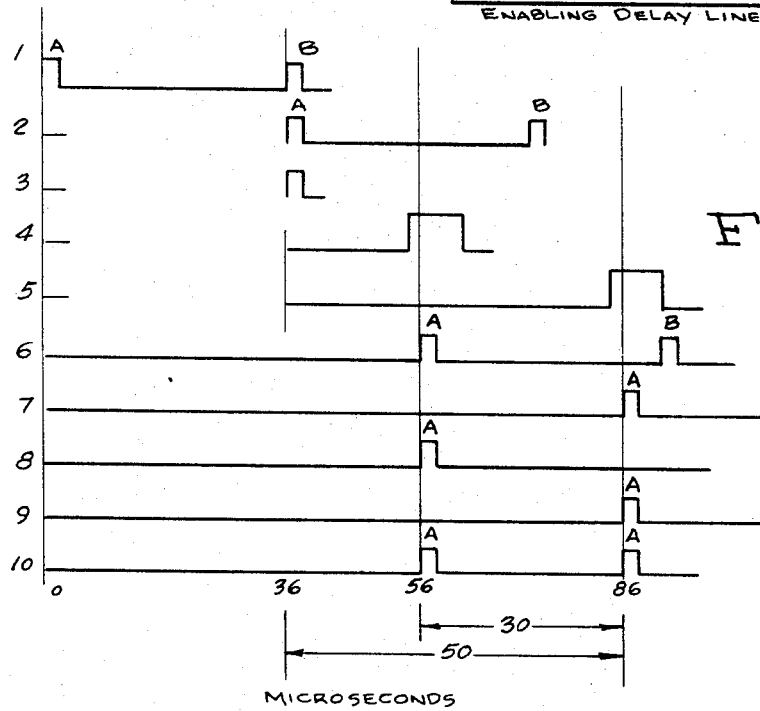
FIG. 1b is a coincident timing diagram which shows the timing of the pulses as they appear in different parts of the invention.

Referring to FIG. 1a, a pair of interrogation pulses separated by 36μs. as shown in line 1 of FIG. 1b are received at the input 21 and amplified by amplifier 22. The interrogation signal at the output of amplifier 22 is then applied to a timing delay line 23, passive in character, and to a coincidence decoder 24. The timing delay line 23 is tapped at 0, 36, 56 and 86μs. intervals as shown. The output at the 36μs. tap of the timing relay line 23 shown in line 2 of FIG. 1b, is applied to the coincidence decoder 24. The coincidence decoder, which is essentially an AND gate, realizes an output only when the signals in line 1 and line 2 of FIG. 1b coincide. This occurs when the B pulse of line 1 coincides with the A pulse of line 2 of FIG. 1b. The output of the decoder 24 in FIG. 1a is shown as a pulse at line 3 of FIG. 1b. This output is then applied to a delay line driver 25 of FIG. 1a which in turn applies its output to an enabling delay line 26. This enabling delay line is passive in character and is tapped at 0, 18 and 48μs. intervals, as shown. The signal in line 3 of FIG. 1b travels down the enabling delay line 26 to the 18μs. tap, and to the 48μs. tap. The output at this 18μs. tap is applied to a first enabling pulse generator 27 which generates a first enabling pulse as shown in line 4 of FIG. 1b. The output at the 48μs. tap is applied to a second enabling pulse generator 28 which generates a second enabling pulse as shown in line 5 of FIG. 1b.

Meanwhile, the timing delay line input pulse shown as A and B of line 1 reaches the 56μs. output tap. The output at the 56μs. output tap is shown in line 6 of FIG. 1b delayed by 56μs. with respect to the input pulse on line 1. These output pulses are then applied to AND gate 30 to which the first enabling pulse shown in line 4 of FIG. 1b is applied. The AND gate 30 generates the single pulse shown in line 8 of FIG. 1b. Note that pulse B in line 6 which appears at the input of AND gate 30 after coming through the 56μs. tap of the timing delay line is ignored by the AND gate 30 because no enabling pulse coincides with it.

The A pulse of line 1 of FIG. 1b which is the timing delay line input appears at the 86μs. output tap of this line in the delay condition shown as pulse A of line 7 of FIG. 1b. The 86μs. tap output is applied to AND gate 31 to which the enabling pulse of line 5 is applied.

The 86μs. delay A pulse shown in line 7 is passed by the AND gate 30 as the single pulse shown in line 9 of FIG. 1b. The 86μs. delayed B pulse shown in line 7 is ignored by the AND gate 30 because no enabling pulse coincides with it. The A pulses in lines 8 and 9 are added to produce a pulse pair as shown in line 10. This pulse pair is then applied to the modulator of a transponder to generate the reply pulse pair.

Figure 2A:
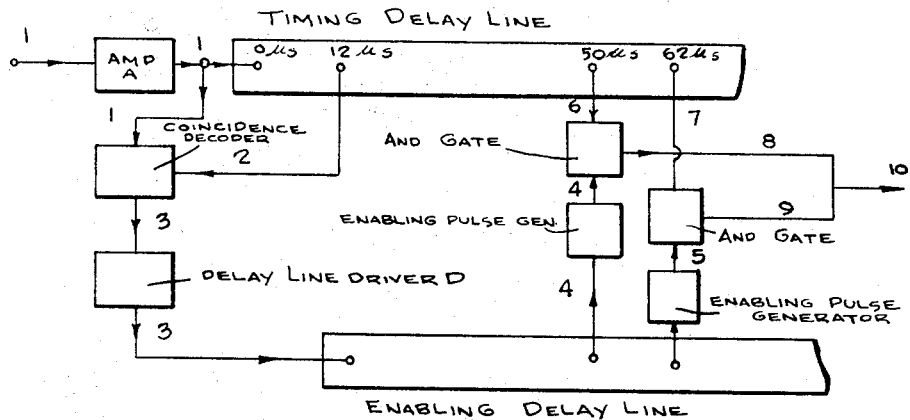
FIG. 2a and FIG. 2b are corresponding diagrams for the case where both interrogation and reply signals are separated by 12μs.
Figure 2B:
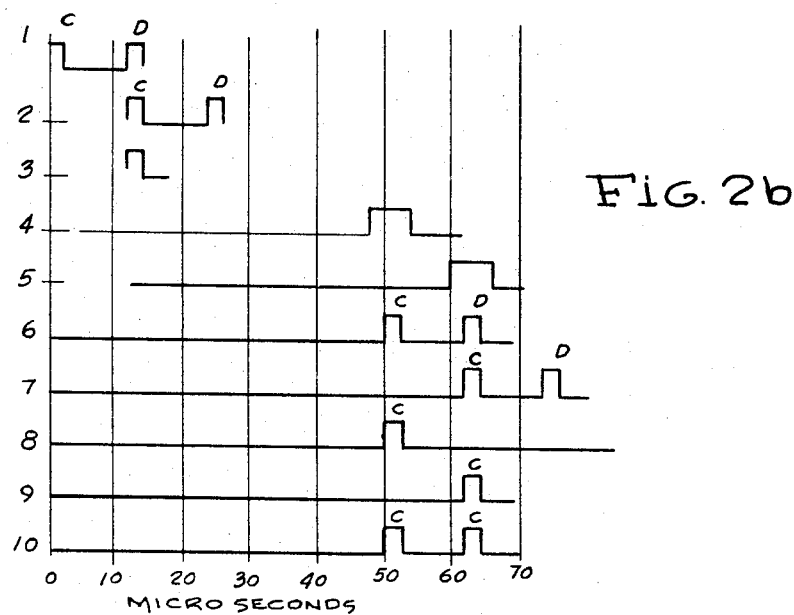

FIGS. 2a and 2b refer to a situation where the interrogation and reply signals are separated 12 micro-seconds. FIGS. 2a and 2b are identical to FIGS. 1a and 1b except for the timing delay intervals. Lines 1 through 10 of FIG. 2b depict graphically the pulse patterns as they appear throughout the circuitry of FIG. 2a at the various numbered points 1 through 10. Input pulses C and D (corresponding to A and B of FIG. 1b) are fed into the circuit at point 1 of FIG. 2a. As the pulses proceed through FIG. 2a, their patterns are shown on the numbered lines of FIG. 2b which correspond to the numbered points of FIG. 2a. The sequence of operation which produces a reply pair of signals in FIG. 2a from the input pair is identical to the operation of FIG. 1a.

We claim:
1. A device for decoding an input pulse pair and for generating a reply pulse pair from single pulses of the input pulse pair comprising:
  (a) a timing delay line for delaying the input pulse pair having an input and plural outputs at spaced predetermined time delay intervals;
  (b) an enabling delay line having an input and plural outputs at spaced predetermined time delay intervals;
  (c) detecting and pulse generating means for passing a single pulse to the enabling delay line input upon a coincidental relationship existing between the input pulse pair and the delay pulse pair, said detecting and pulse generating means responsive to the timing delay line input and a first one of said plural timing delay line outputs;
  (d) pulse generating and gating means for producing the first one of a reply pulse pair upon a coincidental relationship existing between a first one of said plural enabling delay line outputs and a second one of said plural timing delay line outputs, said pulse generating and gating means responsive to a first one of said plural enabling delay line outputs and a second one of said plural timing delay line outputs;
  (e) pulse generating and gating means for producing the second half of a reply pulse pair upon a coincidental relationship existing between a second one of said plural enabling delay line outputs and a third one of said plural timing delay line outputs, said pulse generating and gating means responsive to said second one of said plural enabling delay line outputs and said third one of said plural timing delay line outputs.

2. A device for decoding an input pulse pair and for generating a reply pair from single pulses of the input pulse pair comprising:
  (a) a timing delay line for delaying the input pulse pair having an input, and three outputs at predetermined time delay intervals;
  (b) an enabling delay line having an input and two outputs at predetermined time delay intervals;
  (c) detecting and pulse generating means for passing a single pulse to the enabling delay line input upon a coincidental relationship existing between the input pulse pair and the delay pulse pair, said detecting and pulse generating means responsive to the timing delay line input and the first timing delay line output;
  (d) a first pulse generator fed by the enabling delay line first output for producing a first enabling pulse;
  (e) a first AND gate fed by said first enabling pulse and by the timing delay line second output, producing the first half of the reply pluse pair upon a coincidental relationship existing between said first enabling pulse and said timing delay line second output;
  (f) a second pulse generator fed by the enabling delay line second output for producing a second enabling pulse;
  (g) a second AND gate fed by said second enabling pulse and by the timing delay line third output, producing the second half of the reply pulse pair upon a coincidental relationship existing between said second enabling pulse and said timing delay line third output.

3. The device as set forth in claim 2 wherein said first and second enabling pulses are of greater duration than the input pulses.

4. A device for decoding an input pulse pair and for generating a reply pulse pair from single pulses of the input pulse pair comprising:
  (a) a timing delay line having an input and three outputs at predetermined time delay intervals;
  (b) an enabling delay line having an input and two outputs at predetermined time delay intervals;
  (c) a coincidence decoder having two inputs and one output, one of said inputs connected to said timing delay line output for accepting delayed interrogation pulses, the other said input accepting an undelayed interrogation pulse, said output feeding said enabling delay line, said coincidence decoder producing an output pulse upon a coincidental relationship existing between said delayed interrogation pulses and said undelayed interrogation pulses;
  (d) a first enabling pulse generator connected to said first output of said enabling delay line for producing a first enabling pulse;
  (e) an AND gate having inputs fed by said timing delay line second output and fed by said first enabling pulse generator, said AND gate producing an output pulse upon the proper coincidental relationship existing between input signals;
  (f) a second enabling pulse generator connected to said second output of the enabling delay line for producing a second enabling pulse;
  (g) an AND gate having inputs fed by said second enabling pulse generator and by said timing delay line third output, said AND gate producing an output pulse upon the proper coincidental relationship between input signals.

References Cited
UNITED STATES PATENTS

| | | | |
|---|---|---|---|
| 2,522,609 | 9/1950 | Gloess | 340—167 |
| 3,092,830 | 6/1963 | Clock et al. | 343—6.8 |
| 3,328,762 | 6/1967 | Prather | 340—164 |

DONALD J. YUSKO, *Primary Examiner.*